US012566929B2

(12) United States Patent
Vu et al.

(10) Patent No.: US 12,566,929 B2
(45) Date of Patent: Mar. 3, 2026

(54) COMBINING DATA SELECTION AND REWARD FUNCTIONS FOR TUNING LARGE LANGUAGE MODELS USING REINFORCEMENT LEARNING

(71) Applicant: International Business Machines Corporation, Armonk, NY (US)

(72) Inventors: Long Vu, Chappaqua, NY (US); Nhan Huu Pham, Tarrytown, NY (US); Dharmashankar Subramanian, Rye Brook, NY (US); Todd William Mummert, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 18/410,097

(22) Filed: Jan. 11, 2024

(65) Prior Publication Data

US 2025/0232129 A1    Jul. 17, 2025

(51) Int. Cl.
*G06F 40/40*        (2020.01)
*G06F 40/30*        (2020.01)

(52) U.S. Cl.
CPC .............. *G06F 40/40* (2020.01); *G06F 40/30* (2020.01)

(58) Field of Classification Search
None
See application file for complete search history.

(56) References Cited

U.S. PATENT DOCUMENTS

| | | | |
|---|---|---|---|
| 2019/0362020 A1* | 11/2019 | Paulus | .............. G06F 18/24143 |
| 2021/0174246 A1* | 6/2021 | Triplet | ..................... G06N 7/01 |
| 2023/0132090 A1* | 4/2023 | Yao | ........................ G06F 40/216 |
| | | | 704/9 |
| 2025/0018298 A1* | 1/2025 | Dong | ..................... G06N 3/045 |

FOREIGN PATENT DOCUMENTS

| | | |
|---|---|---|
| CN | 115759254 A | 3/2023 |
| CN | 116244416 A | 6/2023 |
| CN | 116662577 A | 8/2023 |

(Continued)

OTHER PUBLICATIONS

Cao et al. "Instruction Mining: When Data Mining Meets Large Language Model Finetuning". arXiv:2307.06290v2 [cs.CL] Oct. 27, 2023 (Year: 2023).*

(Continued)

*Primary Examiner* — Jesse S Pullias

(74) *Attorney, Agent, or Firm* — Eric W. Chesley

(57) ABSTRACT

A computer-implemented method, a computer program product, and a computer system for tuning large language models. A computer receives pairs of textual prompts and ground truth labels. A computer creates a data selection scoring function, by repurposing one or more reward functions to compute similarity between the textual prompts and the ground truth labels, where the one or more reward functions measure similarity between textual outputs produced by a large language model and the ground truth labels.

(Continued)

120
REWARD FUNCTIONS

100

110
TEXTUAL (PROMPT, TARGET) PAIRS

130
DATA SELECTION SCORING FUNCTION

140
SELECTED (PROMPT, TARGET) PAIRS

150
TUNE LARGE LANGUAGE MODEL USING REINFORCEMENT LEARNING

160
TUNED LARGE LANGUAGE MODEL

A computer selects a training dataset from the pairs of the textual prompts and the ground truth labels, by using the data selection scoring function. A computer tunes the large language model using the training dataset and reinforcement learning with the one or more reward functions.

25 Claims, 5 Drawing Sheets

(56)                    References Cited

FOREIGN PATENT DOCUMENTS

| | | | |
|---|---|---|---|
| CN | 116757652 | A | 9/2023 |
| CN | 116775879 | A | 9/2023 |
| CN | 116805495 | A | 9/2023 |
| CN | 116603249 | B | 10/2023 |
| CN | 116860922 | A | 10/2023 |
| CN | 116861921 | A | 10/2023 |

OTHER PUBLICATIONS

Li et al. "From Quantity to Quality: Boosting LLM Performance with Self-Guided Data Selection for Instruction Tuning". arXiv: 2308.12032v1 [cs.CL] Aug. 23, 2023 (Year: 2023).*

Du et al. "MoDS: Model-oriented Data Selection for Instruction Tuning". arXiv:2311.15653v1 [cs.CL] Nov. 27, 2023 (Year: 2023).*

Zhao et al. "SLIC-HF: Sequence Likelihood Calibration with Human Feedback". arXiv:2305.10425v1 [cs.CL] May 17, 2023 (Year: 2023).*

Wang et al. "Learning to Retrieve In-Context Examples for Large Language Models" arXiv:2307.07164v1 [cs.CL] Jul. 14, 2023 (Year: 2023).*

Mueller et al. "Label Semantic Aware Pre-training for Few-shot Text Classification". arXiv:2204.07128v2 [cs.CL] May 29, 2022 (Year: 2022).*

"3.2. Tuning the hyper-parameters of an estimator", accessed on Nov. 27, 2023, 9 pages, <https://scikit-learn.org/stable/modules/grid_search.html>.

"alexrame / rewardedsoups", GitHub, Accepted at NeurIPS 2023, 4 pages, <https://github.com/alexrame/rewardedsoups>.

"autoai / autodo", accessed on Nov. 29, 2023, 78 pages, <https://github.ibm.com/autoai/autodo/blob/development/config/dynamic/agent_hyperparameters.yaml>.

"IBM-Research-AI / autofm", accessed on Nov. 29, 2023, 3 pages, <https://github.ibm.com/IBM-Research-AI/autotfm>.

"Metric: rouge", accessed on Nov. 27, 2023, 5 pages, <https://huggingface.co/spaces/evaluate-metric/rouge>.

"trlx", Github, CarperAI, accessed on Nov. 27, 2023, 5 pages, <https://github.com/CarperAI/trlx>.

Gulcehre et al., "Reinforced Self-Training (ReST) for Language Modeling", DeepMind, Aug. 22, 2023, arXiv:2308.08998v2 [cs.CL] Aug. 21, 2023, 23 pages.

Lee et al., "Platypus: Quick, Cheap, and Powerful Refinement of LLMs", arXiv:2308.07317v1 [cs.CL] Aug. 14, 2023, 17 pages.

Ouyang et al., "Training language models to follow instructions with human feedback", arXiv:2203.02155v1 [cs.CL] Mar. 4, 2022, 68 pages.

Rame et al., "Rewarded soups: towards Pareto-optimal alignment by interpolating weights fine-tuned on diverse rewards", 37th Conference on Neural Information Processing Systems (NeurIPS 2023), arXiv:2306.04488v2 [cs.LG] Oct. 16, 2023, 41 pages.

Raj et al., "Measuring Reliability of Large Language Models through Semantic Consistency", arXiv:2211.05853 [cs.CL], Apr. 11, 2023, 7 pages.

* cited by examiner

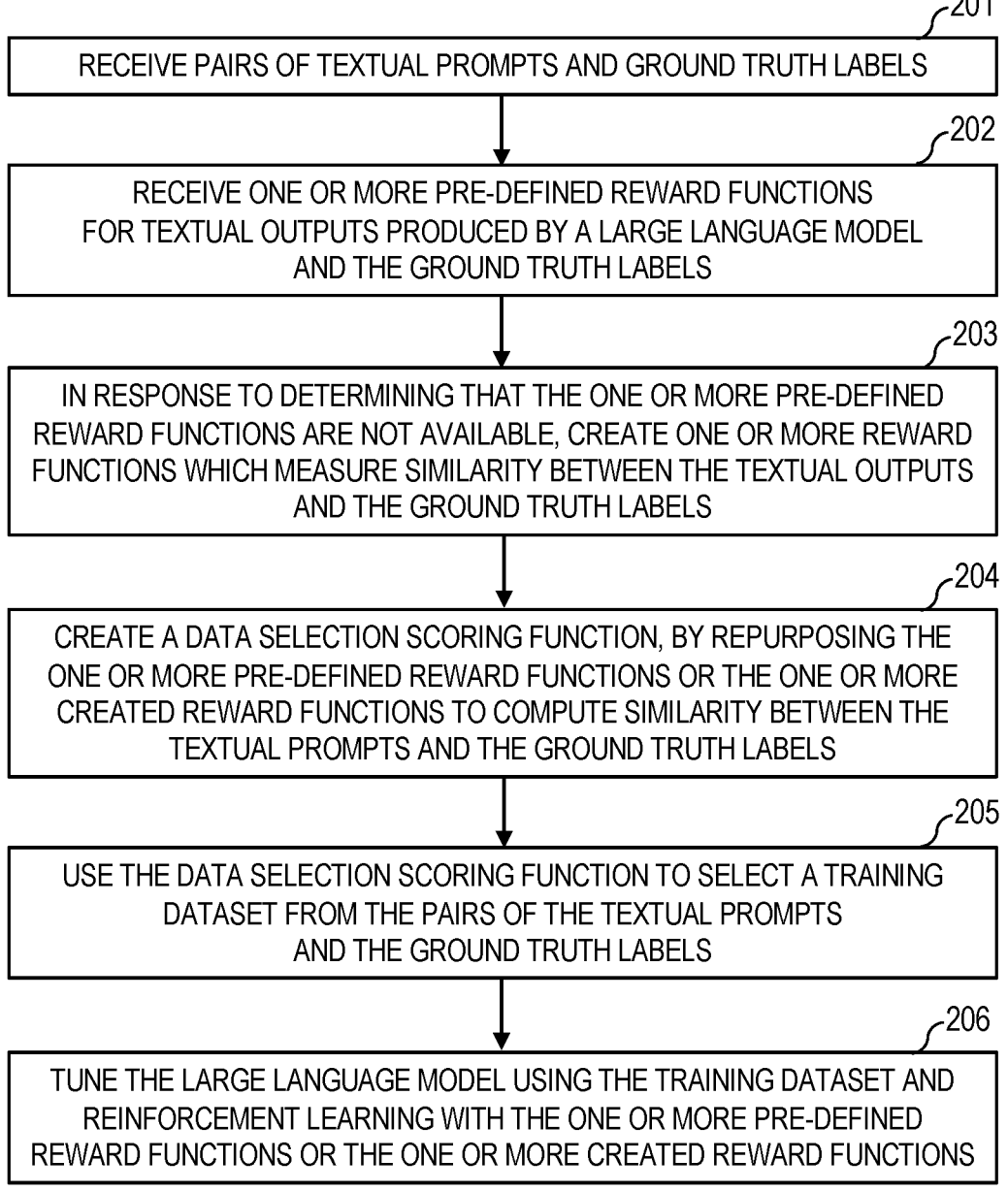

201

RECEIVE PAIRS OF TEXTUAL PROMPTS AND GROUND TRUTH LABELS

202

RECEIVE ONE OR MORE PRE-DEFINED REWARD FUNCTIONS
FOR TEXTUAL OUTPUTS PRODUCED BY A LARGE LANGUAGE MODEL
AND THE GROUND TRUTH LABELS

203

IN RESPONSE TO DETERMINING THAT THE ONE OR MORE PRE-DEFINED
REWARD FUNCTIONS ARE NOT AVAILABLE, CREATE ONE OR MORE REWARD
FUNCTIONS WHICH MEASURE SIMILARITY BETWEEN THE TEXTUAL OUTPUTS
AND THE GROUND TRUTH LABELS

204

CREATE A DATA SELECTION SCORING FUNCTION, BY REPURPOSING THE
ONE OR MORE PRE-DEFINED REWARD FUNCTIONS OR THE ONE OR MORE
CREATED REWARD FUNCTIONS TO COMPUTE SIMILARITY BETWEEN THE
TEXTUAL PROMPTS AND THE GROUND TRUTH LABELS

205

USE THE DATA SELECTION SCORING FUNCTION TO SELECT A TRAINING
DATASET FROM THE PAIRS OF THE TEXTUAL PROMPTS
AND THE GROUND TRUTH LABELS

206

TUNE THE LARGE LANGUAGE MODEL USING THE TRAINING DATASET AND
REINFORCEMENT LEARNING WITH THE ONE OR MORE PRE-DEFINED
REWARD FUNCTIONS OR THE ONE OR MORE CREATED REWARD FUNCTIONS

FIG. 2

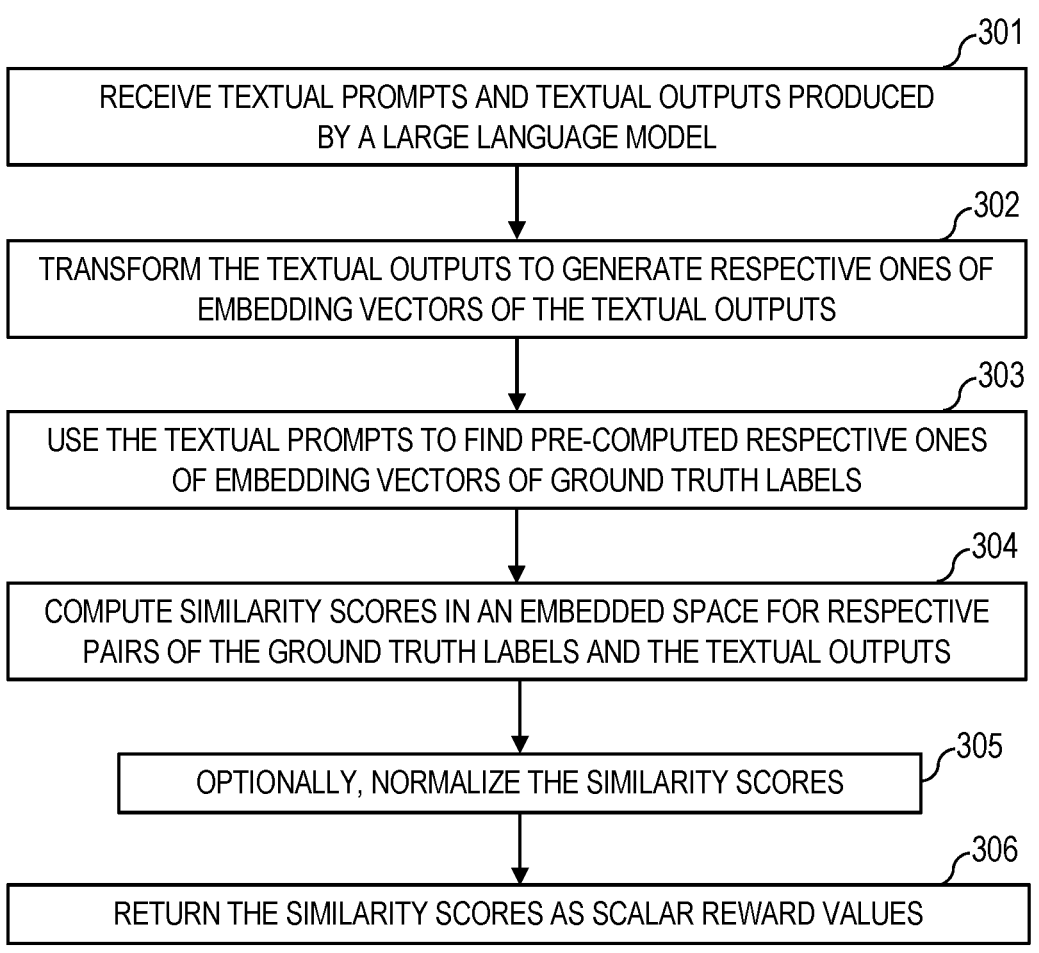

301

RECEIVE TEXTUAL PROMPTS AND TEXTUAL OUTPUTS PRODUCED
BY A LARGE LANGUAGE MODEL

302

TRANSFORM THE TEXTUAL OUTPUTS TO GENERATE RESPECTIVE ONES OF
EMBEDDING VECTORS OF THE TEXTUAL OUTPUTS

303

USE THE TEXTUAL PROMPTS TO FIND PRE-COMPUTED RESPECTIVE ONES
OF EMBEDDING VECTORS OF GROUND TRUTH LABELS

304

COMPUTE SIMILARITY SCORES IN AN EMBEDDED SPACE FOR RESPECTIVE
PAIRS OF THE GROUND TRUTH LABELS AND THE TEXTUAL OUTPUTS

305

OPTIONALLY, NORMALIZE THE SIMILARITY SCORES

306

RETURN THE SIMILARITY SCORES AS SCALAR REWARD VALUES

FIG. 3

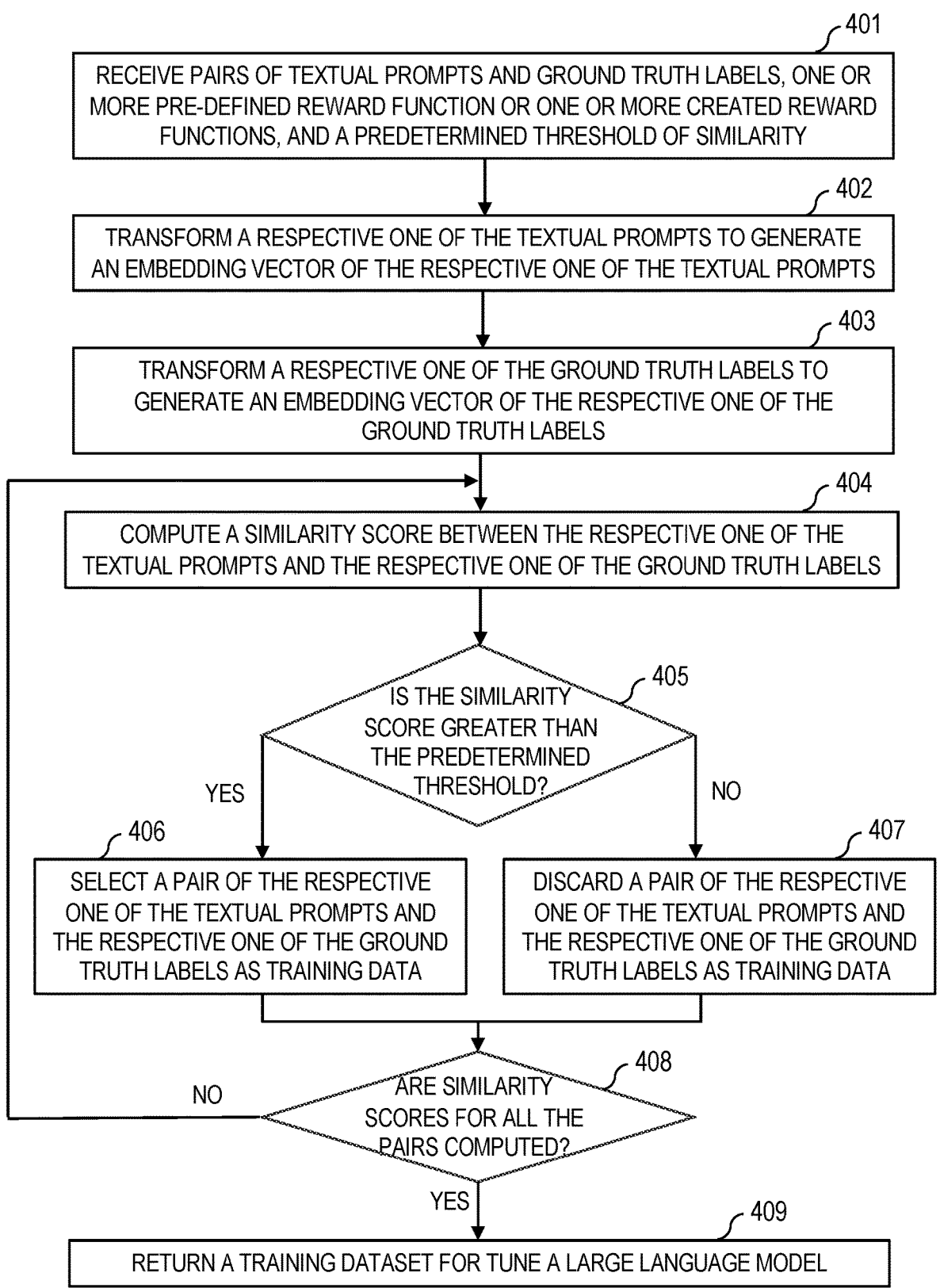

401

RECEIVE PAIRS OF TEXTUAL PROMPTS AND GROUND TRUTH LABELS, ONE OR MORE PRE-DEFINED REWARD FUNCTION OR ONE OR MORE CREATED REWARD FUNCTIONS, AND A PREDETERMINED THRESHOLD OF SIMILARITY

402

TRANSFORM A RESPECTIVE ONE OF THE TEXTUAL PROMPTS TO GENERATE AN EMBEDDING VECTOR OF THE RESPECTIVE ONE OF THE TEXTUAL PROMPTS

403

TRANSFORM A RESPECTIVE ONE OF THE GROUND TRUTH LABELS TO GENERATE AN EMBEDDING VECTOR OF THE RESPECTIVE ONE OF THE GROUND TRUTH LABELS

404

COMPUTE A SIMILARITY SCORE BETWEEN THE RESPECTIVE ONE OF THE TEXTUAL PROMPTS AND THE RESPECTIVE ONE OF THE GROUND TRUTH LABELS

405

IS THE SIMILARITY SCORE GREATER THAN THE PREDETERMINED THRESHOLD?

YES     NO

406

SELECT A PAIR OF THE RESPECTIVE ONE OF THE TEXTUAL PROMPTS AND THE RESPECTIVE ONE OF THE GROUND TRUTH LABELS AS TRAINING DATA

407

DISCARD A PAIR OF THE RESPECTIVE ONE OF THE TEXTUAL PROMPTS AND THE RESPECTIVE ONE OF THE GROUND TRUTH LABELS AS TRAINING DATA

408

NO     ARE SIMILARITY SCORES FOR ALL THE PAIRS COMPUTED?

YES

409

RETURN A TRAINING DATASET FOR TUNE A LARGE LANGUAGE MODEL

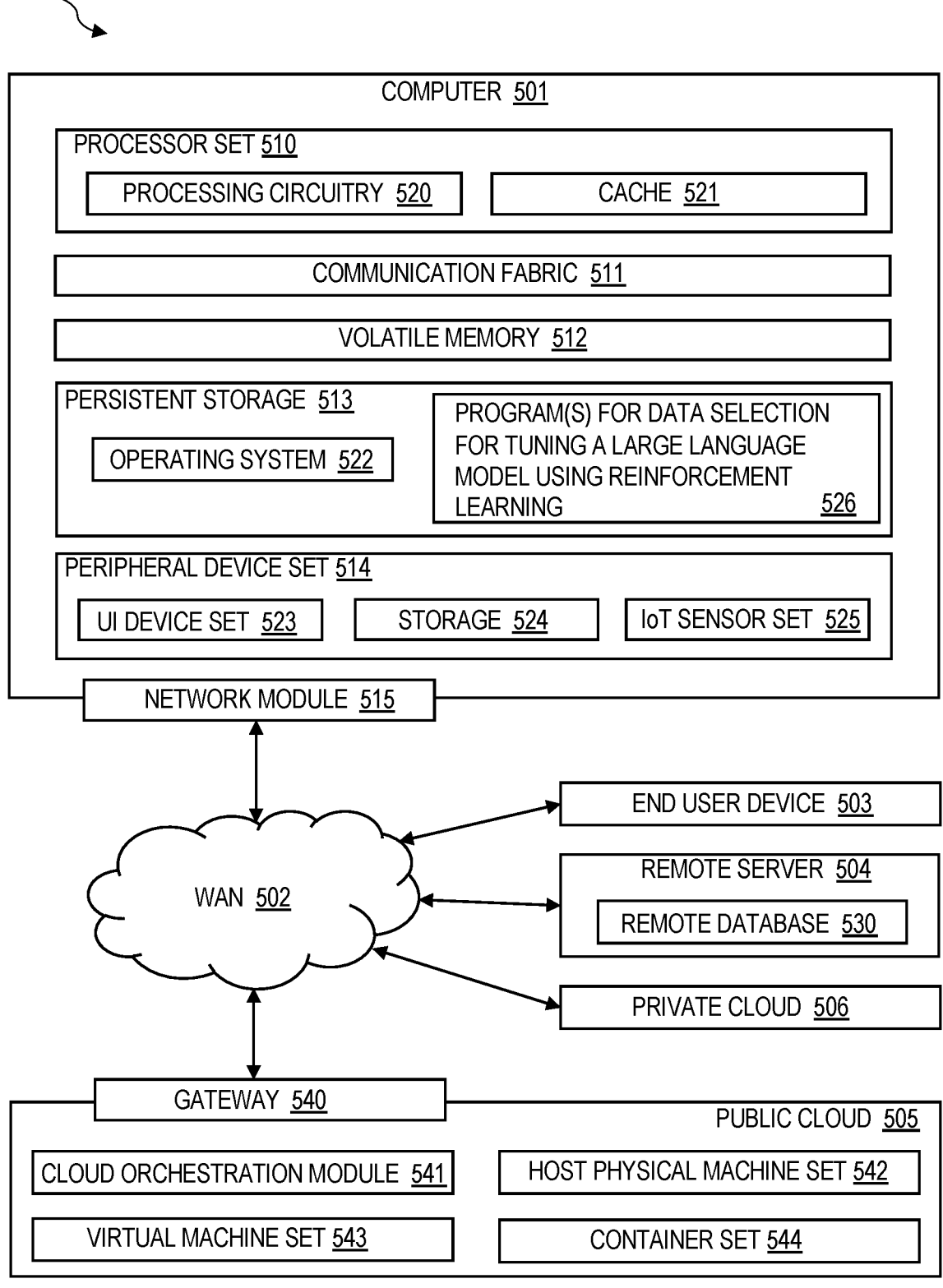

COMPUTER 501

PROCESSOR SET 510

PROCESSING CIRCUITRY 520    CACHE 521

COMMUNICATION FABRIC 511

VOLATILE MEMORY 512

PERSISTENT STORAGE 513

OPERATING SYSTEM 522

PROGRAM(S) FOR DATA SELECTION FOR TUNING A LARGE LANGUAGE MODEL USING REINFORCEMENT LEARNING                526

PERIPHERAL DEVICE SET 514

UI DEVICE SET 523    STORAGE 524    IoT SENSOR SET 525

NETWORK MODULE 515

WAN 502

END USER DEVICE 503

REMOTE SERVER 504

REMOTE DATABASE 530

PRIVATE CLOUD 506

GATEWAY 540

PUBLIC CLOUD 505

CLOUD ORCHESTRATION MODULE 541    HOST PHYSICAL MACHINE SET 542

VIRTUAL MACHINE SET 543    CONTAINER SET 544

FIG. 5

COMBINING DATA SELECTION AND REWARD FUNCTIONS FOR TUNING LARGE LANGUAGE MODELS USING REINFORCEMENT LEARNING

BACKGROUND

The present invention relates generally to tuning large language models, and more particularly to combining data selection and reward functions for tuning large language models using reinforcement learning.

In many enterprise applications, it is needed to find mappings between a set of textual entities (or textual prompts) and a set of textual targets (or textual categories). The textual entities (or textual prompts) and the textual targets (or textual categories) are related to each other. For the input of the textual entities (or textual prompts) and the textual targets (or textual categories), the output is pairs of the textual entities (or textual prompts) and the textual targets (or textual categories).

Examples of use cases of mapping the set of textual entities (or textual prompts) and the set of textual targets (or textual categories) includes semantic matching, application programming interface (API) matching, entity matching, table matching, and schema matching. For the semantic matching, the input includes a column name and other column names in a same table and further includes glossary items or concepts, and the output is mapping the column name and a correct concept. For the API matching, the input includes a function name, function specs, and input argument specifications, and the output is mapping of the function to a correct category. For the entity matching, the input includes an entity in a database table and table metadata, and the output is mapping the entity to a group.

A publication (Ouyang, et al., Training language models to follow instructions with human feedback, arXiv: 2203.02155v1, 2022) discloses a method in which human preferences on manually annotated training set are used to train a reward model and then tune large language models. Another publication (Ramé et al., Rewarded soups: towards Pareto-optimal alignment by interpolating weights fine-tuned on diverse rewards, arXiv:2306.04488v2, 2023) discloses a method in which multiple large language models with multiple reward functions are trained on a same input data set. Since the multiple large language models have the same initial architecture, the weights of multiple large language models are merged into one final multiple large language model that provides prediction for test prompts. Yet another publication (Lee, et al., Platypus: Quick, Cheap, and Powerful Refinement of LLMs, arXiv:2308.07317v1, 2023) discloses a method in which a curated data set is created for fine tuning tune large language models using supervised fine-tuning.

A patent application (CN115759254A, 2022) discloses a scheme that incorporates a knowledge graph into training a new large language model. Another patent application (CN116244416A, 2023) provides a generative large language model training method; in the training method, a first training set is constructed based on a user input text and a matched service interface calling sequence, and a second training set is constructed based on a user preference sequence. Yet another patent application (CN116662577A, 2023) provides a knowledge graph-based large language model training method. Yet another patent application (CN116757652A, 2023) discloses a recruitment recommendation system based on a large language model; in the disclosure, fine tuning of the large language model uses online recruitment data. Yet another patent application (CN116775879A, 2023) relates to a fine tuning training method of a large language model; the fine tuning of the large language model uses a training dataset obtained by processing historical data. Yet another patent application (CN116805495A, 2023) provides a pronunciation deviation detection and action feedback method and system based on a large language model; in the method and system, a fine tuning large language model is obtained based on the pronunciation action feedback data set. Yet another patent application (CN116603249A, 2023) provides a training method of a large language model applied to role playing reasoning games; the patent application discloses acquiring training data of a target game and performing reinforcement learning training on the large language model according to the feedback of each user. Yet another patent application (CN116860922A, 2023) provides a self-correcting intelligent teaching auxiliary method based on an instruction-guided large language model; for training the large language model, mass data related to teaching is acquired and distributed training is carried out. Yet another patent application (CN116861921A, 2023) discloses a robot task analysis based on a large language model; in the disclosure, data related to a robot task is collected and preprocessed to obtain training data, and the training data comprises task description of natural language and corresponding task analysis results.

SUMMARY

In one aspect, a computer-implemented method for tuning large language models is provided. The computer-implemented method includes receiving pairs of textual prompts and ground truth labels. The computer-implemented method further includes creating a data selection scoring function, by repurposing one or more reward functions to compute similarity between the textual prompts and the ground truth labels, where the one or more reward functions measure similarity between textual outputs produced by a large language model and the ground truth labels. The computer-implemented method further includes selecting a training dataset from the pairs of the textual prompts and the ground truth labels, by using the data selection scoring function. The computer-implemented method further includes tuning the large language model using the training dataset and reinforcement learning with the one or more reward functions.

In another aspect, a computer program product for tuning large language models is provided. The computer program product comprises a computer readable storage medium having program instructions embodied therewith, and the program instructions are executable by one or more processors. The program instructions are executable to receive pairs of textual prompts and ground truth labels. The program instructions are further executable to create a data selection scoring function, by repurposing one or more reward functions to compute similarity between the textual prompts and the ground truth labels, where the one or more reward functions measure similarity between textual outputs produced by a large language model and the ground truth labels. The program instructions are further executable to select a training dataset from the pairs of the textual prompts and the ground truth labels, by using the data selection scoring function. The program instructions are further executable to tune the large language model using the training dataset and reinforcement learning with the one or more reward functions.

In yet another aspect, a computer system for tuning large language models is provided. The computer system comprises one or more processors, one or more computer readable tangible storage devices, and program instructions stored on at least one of the one or more computer readable tangible storage devices for execution by at least one of the one or more processors. The program instructions are executable to: receive pairs of textual prompts and ground truth labels; create a data selection scoring function, by repurposing one or more reward functions to compute similarity between the textual prompts and the ground truth labels, where the one or more reward functions measure similarity between textual outputs produced by a large language model and the ground truth labels; select a training dataset from the pairs of the textual prompts and the ground truth labels, by using the data selection scoring function; and tune the large language model using the training dataset and reinforcement learning with the one or more reward functions.

In yet another aspect, a computer-implemented method for tuning large language models is provided. The computer-implemented method includes receiving pairs of textual prompts and ground truth labels. The computer-implemented method further includes receiving one or more predefined reward functions measuring similarity between textual outputs produced by a large language model and the ground truth labels, in response to determining that the one or more pre-defined reward functions are available. The computer-implemented method further includes creating one or more reward functions measuring the similarity between the textual outputs and the ground truth labels, in response to determining that the one or more pre-defined reward functions are not available. The computer-implemented method further includes creating a data selection scoring function, by repurposing the one or more predefined reward functions or the one or more reward functions to compute similarity between the textual prompts and the ground truth labels. The computer-implemented method further includes selecting a training dataset from the pairs of the textual prompts and the ground truth labels, by using the data selection scoring function. The computer-implemented method further includes tuning the large language model using the training dataset and reinforcement learning with the one or more predefined reward functions or the one or more reward functions.

In yet another aspect, a computer program product for tuning large language models is provided. The computer program product comprises a computer readable storage medium having program instructions embodied therewith, and the program instructions are executable by one or more processors. The program instructions are executable to: receive pairs of textual prompts and ground truth labels; receive one or more predefined reward functions measuring similarity between textual outputs produced by a large language model and the ground truth labels, in response to determining that the one or more pre-defined reward functions are available; create one or more reward functions measuring the similarity between the textual outputs and the ground truth labels, in response to determining that the one or more pre-defined reward functions are not available; create a data selection scoring function, by repurposing the one or more predefined reward functions or the one or more reward functions to compute similarity between the textual prompts and the ground truth labels; select a training dataset from the pairs of the textual prompts and the ground truth labels, by using the data selection scoring function; and tune the large language model using the training dataset and reinforcement learning with the one or more predefined reward functions or the one or more reward functions.

BRIEF DESCRIPTION OF THE SEVERAL VIEWS OF THE DRAWINGS

FIG. 2 is a flowchart showing operational steps of combining data selection and reward functions for tuning large language models using reinforcement learning, in accordance with one embodiment of the present invention.

FIG. 3 is a flowchart showing operational steps of creating reward functions for tuning large language models, in accordance with one embodiment of the present invention.

FIG. 4 is a flowchart showing operational steps of data selection for tuning large language models, in accordance with one embodiment of the present invention.

FIG. 5 is a systematic diagram illustrating an example of an environment for the execution of at least some of the computer code involved in combining data selection and reward functions for tuning large language models using reinforcement learning, in accordance with one embodiment of the present invention.

DETAILED DESCRIPTION

Figure 1:
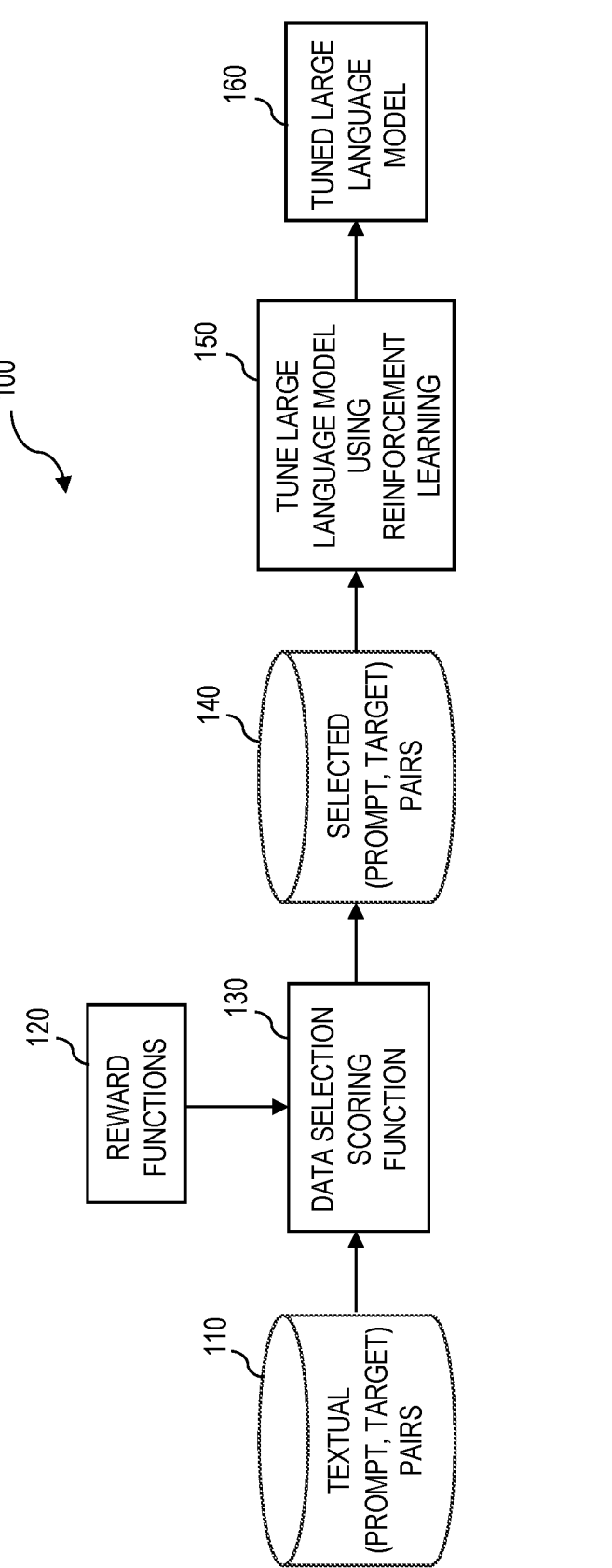
FIG. 1 illustrates a system of combining data selection and reward functions for tuning large language models using reinforcement learning, in accordance with one embodiment of the present invention.

Embodiments of the present invention disclose a first computer-implemented method for tuning large language models. The first computer-implemented method includes receiving pairs of textual prompts and ground truth labels. The first computer-implemented method further includes creating a data selection scoring function, by repurposing one or more reward functions to compute similarity between the textual prompts and the ground truth labels, where the one or more reward functions measure similarity between textual outputs produced by a large language model and the ground truth labels. The first computer-implemented method further includes selecting a training dataset from the pairs of the textual prompts and the ground truth labels, by using the data selection scoring function. The first computer-implemented method further includes tuning the large language model using the training dataset and reinforcement learning with the one or more reward functions.

Other embodiments of the first computer-implemented method further includes creating the one or more reward functions, in response to determining that one or more pre-defined reward functions are not available. Yet other embodiments of the first computer-implemented method further includes receiving the one or more reward functions, where the one or more reward functions is predefined. In yet other embodiments, one of the one or more reward function measures cosine similarity in a transformed space. In yet other embodiments, one of the one or more reward function measures domain knowledge based rouge-L similarity. In yet other embodiments, one of the one or more reward function measures BERTscore semantic similarity.

Embodiments of the present invention disclose a first computer program product for tuning large language models. The first computer program product comprises a computer readable storage medium having program instructions embodied therewith, and the program instructions are executable by one or more processors. The program instructions are executable to receive pairs of textual prompts and ground truth labels. The program instructions are further executable to create a data selection scoring function, by repurposing one or more reward functions to compute similarity between the textual prompts and the ground truth labels, where the one or more reward functions measure similarity between textual outputs produced by a large language model and the ground truth labels. The program instructions are further executable to select a training dataset from the pairs of the textual prompts and the ground truth labels, by using the data selection scoring function. The program instructions are further executable to tune the large language model using the training dataset and reinforcement learning with the one or more reward functions.

Other embodiments of the first computer program product further include comprising the program instructions executable to create the one or more reward functions, in response to determining that one or more pre-defined reward functions are not available. Yet other embodiments of the first computer program product further include comprising the program instructions executable to receive the one or more reward functions, where the one or more reward functions is predefined. In yet other embodiments of the first computer program product, one of the one or more reward function measures cosine similarity in a transformed space. In yet other embodiments of the first computer program product, one of the one or more reward function measures domain knowledge based rouge-L similarity. In yet other embodiments of the first computer program product, one of the one or more reward function measures BERTscore semantic similarity.

Embodiments of the present invention disclose a computer system for tuning large language models. The computer system comprises one or more processors, one or more computer readable tangible storage devices, and program instructions stored on at least one of the one or more computer readable tangible storage devices for execution by at least one of the one or more processors. The program instructions are executable to: receive pairs of textual prompts and ground truth labels; create a data selection scoring function, by repurposing one or more reward functions to compute similarity between the textual prompts and the ground truth labels, where the one or more reward functions measure similarity between textual outputs produced by a large language model and the ground truth labels; select a training dataset from the pairs of the textual prompts and the ground truth labels, by using the data selection scoring function; and tune the large language model using the training dataset and reinforcement learning with the one or more reward functions.

Other embodiments of the computer system further include comprising the program instructions executable to create the one or more reward functions, in response to determining that one or more pre-defined reward functions are not available. Yet other embodiments of the computer system further include comprising the program instructions executable to receive the one or more reward functions, where the one or more reward functions is predefined. In yet other embodiments of the computer system, one of the one or more reward function measures cosine similarity in a transformed space. In yet other embodiments of the computer system, one of the one or more reward function measures domain knowledge based rouge-L similarity. In yet other embodiments of the computer system, one of the one or more reward function measures BERTscore semantic similarity.

Embodiments of the present invention disclose a second computer-implemented method for tuning large language models. The second computer-implemented method includes receiving pairs of textual prompts and ground truth labels. The second computer-implemented method further includes receiving one or more predefined reward functions measuring similarity between textual outputs produced by a large language model and the ground truth labels, in response to determining that the one or more pre-defined reward functions are available. The second computer-implemented method further includes creating one or more reward functions measuring the similarity between the textual outputs and the ground truth labels, in response to determining that the one or more pre-defined reward functions are not available. The second computer-implemented method further includes creating a data selection scoring function, by repurposing the one or more predefined reward functions or the one or more reward functions to compute similarity between the textual prompts and the ground truth labels. The second computer-implemented method further includes selecting a training dataset from the pairs of the textual prompts and the ground truth labels, by using the data selection scoring function. The second computer-implemented method further includes tuning the large language model using the training dataset and reinforcement learning with the one or more predefined reward functions or the one or more reward functions.

Other embodiments of the second computer-implemented method further includes: transforming a respective one of the textual prompts to generate an embedding vector of the respective one of the textual prompts; transforming a respective one of the ground truth labels to generate an embedding vector of the respective one of the ground truth labels; and computing a similarity score between the respective one of the textual prompts and the respective one of the ground truth labels, by using the one or more predefined reward functions or the one or more reward functions. Yet other embodiments of the second computer-implemented method further includes: determining whether the similarity score is greater than a predetermined threshold; and adding a pair of the respective one of the textual prompts and the respective one of the ground truth labels into the training dataset, in response to determining that the similarity score is greater than a predetermined threshold. Yet other embodiments of the second computer-implemented method further includes excluding the pair of the respective one of the textual prompts and the respective one of the ground truth labels from the training dataset, in response to determining that the similarity score is not greater than a predetermined threshold.

Embodiments of the present invention disclose a second computer program product for tuning large language models. The second computer program product comprises a computer readable storage medium having program instructions embodied therewith, and the program instructions are executable by one or more processors. The program instructions are executable to: receive pairs of textual prompts and ground truth labels; receive one or more predefined reward functions measuring similarity between textual outputs produced by a large language model and the ground truth labels, in response to determining that the one or more pre-defined reward functions are available; create one or more reward functions measuring the similarity between the textual outputs and the ground truth labels, in response to determining that the one or more pre-defined reward functions are not available; create a data selection scoring function, by repurposing the one or more predefined reward functions or the one or more reward functions to compute similarity between the textual prompts and the ground truth labels; select a training dataset from the pairs of the textual prompts and the ground truth labels, by using the data selection scoring function; and tune the large language model using the training dataset and reinforcement learning with the one or more predefined reward functions or the one or more reward functions.

Other embodiments of the second computer program product further include comprising the program instructions executable to: transform a respective one of the textual prompts to generate an embedding vector of the respective one of the textual prompts; transform a respective one of the ground truth labels to generate an embedding vector of the respective one of the ground truth labels; and compute a similarity score between the respective one of the textual prompts and the respective one of the ground truth labels, by using the one or more predefined reward functions or the one or more reward functions. Yet other embodiments of the second computer program product further include comprising the program instructions executable to: determining whether the similarity score is greater than a predetermined threshold; adding a pair of the respective one of the textual prompts and the respective one of the ground truth labels into the training dataset, in response to determining that the similarity score is greater than a predetermined threshold; and excluding the pair of the respective one of the textual prompts and the respective one of the ground truth labels from the training dataset, in response to determining that the similarity score is not greater than a predetermined threshold.

In existing techniques of tuning a large language model, a training dataset is manually created and human preferences are specified; for example, for one input prompt, a human creates two different ground truth labels and specifies which ground truth label matches the input prompt better, and then this human preference is used to train or tune a larger language model. Embodiments of the present invention disclose a system and method of selecting pairs of input prompts and ground truth labels for training or tuning a large language model.

Embodiments of the present invention disclose a system/ method of repurposing reward functions to select pairs of input prompts and ground truth labels; the reward functions capture application-specific measurements (e.g., cosine similarity in a transformed space, semantic similarity, domain knowledge based similarity, etc.). The system/ method in the present invention selects the pairs of input prompts and ground truth labels by using application-specific logics defined in the reward functions.

A system/method disclosed in embodiments of the present invention uses application-specific measurements to compute reward scalars between ground truth labels and outputs produced by a large language model. The reward scalars then are used by a reinforcement learning (RL) agent for training or tuning a large language model. A system/method proposed in embodiments of the present invention uses the same application-specific measurements to select pairs of input prompts and ground truth labels for training or tuning a large language model. In selecting the pairs of input prompts and ground truth labels, semantic similarity between an input prompt and a ground truth label can be measured in a transformed space (e.g., by Hugging Face sentence transformers), and a similar procedure defined in reward functions that is for pairs of the outputs produced by the large language model and the ground truth labels can be used. Similarity scores can be used to filter out irrelevant pairs of the input prompts and ground truth labels.

FIG. 1 illustrates system 100 of combining data selection and reward functions for tuning large language models using reinforcement learning, in accordance with one embodiment of the present invention. System 100 is hosted by a computer system or a server. The computer system or server may be any electronic device capable of receiving input from a user, executing computer program instructions, and communicating with another computing system or another server. Computer 501 shown in FIG. 5 is an example of the computer system or server.

System 100 includes pairs 110 of textual prompts and textual targets (or ground truth labels) as the input to the system. System 100 further includes one or more reward functions 120. One or more reward functions 120 may be predefined for textual outputs produced by a large language model and the ground truth labels. If one or more predefined reward functions 120 are not available, system 100 creates one or more reward functions 120.

One or more reward functions 120 (either predefined or created) measure similarity between textual outputs produced by a large language model and ground truth labels. One or more reward functions 120 may include, for example, a reward function measuring cosine similarity in a transformed space. One or more reward functions 120 may further include, for example, a reward function measuring domain knowledge based rouge-L similarity. One or more reward functions 120 may further include, for example, a reward function measuring BERTscore semantic similarity. Different similarity metrics of the different reward functions focus on different aspects of the text (e.g., token level, semantic level, etc.)

System 100 further includes data selection scoring function 130. System 100 creates data selection scoring function 130 by repurposing one or more reward functions 120 to compute similarity between input prompts and ground truth labels. Based on the computed similarity scores, system 100 selects from pairs 110 of textual prompts and ground truth labels to generate selected pairs 140 of input prompts and ground truth labels. As indicated by numeral 150, system 100 trains or tunes a large language model using reinforcement learning with one or more reward functions 120 and selected pairs 140 of input prompts and ground truth labels. The output of system 100 is tuned large language model 160.

FIG. 2 is a flowchart showing operational steps of combining data selection and reward functions for tuning large language models using reinforcement learning, in accordance with one embodiment of the present invention. The operational steps are executed by the disclosed system which is hosted by a computer system or a server. The computer system or server may be any electronic device capable of receiving input from a user, executing computer program instructions, and communicating with another computing system or another server. Computer 501 shown in FIG. 5 is an example of the computer system or server.

In step 201, the computer system or server receives pairs of textual prompts and ground truth labels. A dataset including the pairs of textual prompts and ground truth labels is the input to the computer system or server. In the embodiment shown in FIG. 1, system 100 receives pairs 110 of textual prompts and textual targets (or ground truth labels).

In step 202, the computer system or server receives one or more pre-defined reward functions for textual outputs produced by a large language model and the ground truth labels. For each ground truth label corresponding to a textual prompt, the large language model produces a textual output. In one embodiment, the one or more pre-defined reward functions are the input of the computer system or server. The one or more pre-defined reward functions measure similarity between a textual output produced by a large language model and a ground truth label. For example, one reward function measures cosine similarity in a transformed space, another reward function measures domain knowledge based rouge-L similarity, and yet another reward function measures BERTscore semantic similarity. Similarity metrics of the one or more reward functions focus on respective aspects of the text. In the embodiment shown in FIG. 1, system 100 receives reward functions 120.

In one embodiment, the one or more pre-defined reward functions may be already available as an input of the computer system or server. In another embodiment, however, the one or more pre-defined reward functions may not be already available; therefore, the computer system or server needs to create one or more reward functions. In response to determining that the one or more pre-defined reward functions are not available, in step 203, the computer system or server creates one or more reward functions which measure similarity between textual outputs produced by a large language model and the ground truth labels. For each ground truth label corresponding to a textual prompt, the computer system or server uses the large language model to produce a textual output. In the embodiment shown in FIG. 1, system 100 creates reward functions 120.

In step 204, the computer system or server creates a data selection scoring function, by repurposing the one or more pre-defined reward functions (if available and received in step 202) or the one or more created reward functions (created in step 203) to compute the similarity between the textual prompts and the ground truth labels. In the embodiment shown in FIG. 1, system 100 creates data selection scoring function 130.

In step 205, the computer system or server uses the data selection scoring function to select a training dataset from the pairs of the textual prompts and the ground truth labels. A dataset including the pairs of the textual prompts and the ground truth labels is received in step 201. From the dataset including the pairs of the textual prompts and the ground truth labels, the computer system or server selects a subset of the dataset as a training dataset for turning the large language model. To select the training dataset, the computer system or server uses the data selection scoring function created in step 204. In the embodiment shown in FIG. 1, system 100 uses data selection scoring function 130 to generate selected pairs 140 of input prompts and ground truth labels; selected pairs 140 of input prompts and ground truth labels is selected from pairs 110 of textual prompts and textual targets (or ground truth labels).

In step 206, the computer system or server tunes the large language model using the training dataset (generated in step 205) and reinforcement learning with the one or more pre-defined reward functions (if available and received in step 202) or the one or more created reward functions (created in step 203). In tuning the large language model, the computer system or server uses a reinforcement learning agent which uses reward scalar values in tuning the large language model. The computer system or server computes the reward scalar values using the one or more pre-defined reward functions (if available and received in step 202) or the one or more created reward functions (created in step 203). In the embodiment shown in FIG. 1, system 100 tunes the large language model using reinforcement learning and selected pairs 140 of input prompts and ground truth labels. In the reinforcement learning, a reinforcement learning agent in system 100 uses reward scalar values computed by system 100 using reward functions 120. System 100 outputs tuned large language model 160.

FIG. 3 is a flowchart showing operational steps of creating reward functions for tuning large language models, in accordance with one embodiment of the present invention. The operational steps are executed by the proposed system which is hosted by a computer system or a server. The computer system or server may be any electronic device capable of receiving input from a user, executing computer program instructions, and communicating with another computing system or another server. Computer 501 shown in FIG. 5 is an example of the computer system or server.

In step 301, the computer system or server receives textual prompts and textual outputs produced by a large language model. For each ground truth label corresponding to a textual prompt, the large language model produces a textual output. In step 302, the computer system or server transforms the textual outputs to generate respective ones of embedding vectors of the textual outputs. For example, the computer system or server uses the Hugging Face sentence transformer to result in an embedding vector for a textual output produced by the large language model. The Hugging Face sentence transformer is a Python framework for state-of-the-art sentence, text and image embeddings.

In step 303, the computer system or server uses the textual prompts to find pre-computed respective ones of embedding vectors of ground truth labels, where the ground truth labels are corresponding to respective ones of the textual prompts. Note that each of the embedding vectors of the ground truth labels is pre-computed and only done once for all labeled responses. For example, the ground truth labels are embedded using the Hugging Face sentence transformer.

In step 304, the computer system or server computes similarity scores in an embedded space for respective pairs of the ground truth labels and the textual outputs. For example, the computer system or server computes cosine similarity and BERTscore semantic similarity. Optionally, in step 305, the computer system or server normalizes the similarity scores computed in step 304. For example, the computer system or server converts the similarity scores to fixed range of [0, 1]. In step 306, the computer system or server returns the similarity scores as scalar reward values. The scalar reward values are used by a reinforcement learning agent in tuning the large language model.

FIG. 4 is a flowchart showing operational steps of data selection for tuning large language models, in accordance with one embodiment of the present invention. The operational steps are executed by the proposed system which is hosted by a computer system or a server. The computer system or server may be any electronic device capable of receiving input from a user, executing computer program instructions, and communicating with another computing system or another server. Computer 501 shown in FIG. 5 is an example of the computer system or server.

In step 401, the computer system or server receives pairs of textual prompts and ground truth labels, one or more pre-defined reward functions or one or more created reward functions, and a predetermined threshold of similarity. The computer system or server receives a set of the pairs of the textual prompts and the ground truth labels. After receiving this set of the pairs of the textual prompts and the ground truth labels, the computer system or server will, in next operational steps, select a training dataset for tuning the large language model. In the embodiment shown in FIG. 1, system 100 receives pairs 110 of textual prompts and textual targets (or ground truth labels). In the embodiment shown in FIG. 1, system 100 receives reward functions 120 which are either pre-defined or created by the computer system or server. The predetermined threshold of similarity is used to filter out irrelevant pairs of textual prompts and ground truth labels and to select a training dataset for tuning a large language model.

In step 402, the computer system or server transforms a respective one of the textual prompts to generate an embedding vector of the respective one of the textual prompts. The computer system or server uses a same transformer specified in the one or more pre-defined reward functions or the one or more created reward functions to transform the respective one of the textual prompts to an embedded space. For example, the computer system or server uses the Hugging Face sentence transformer.

In step 403, the computer system or server transforms a respective one of the ground truth labels to generate an embedding vector of the respective one of the ground truth labels. The respective one of the ground truth labels is corresponding to the respective one of the textual prompts; in other words, the respective one of the textual prompts and the respective one of the ground truth labels are a pair. The computer system or server uses the same transformer specified in the one or more pre-defined reward functions or the one or more created reward functions to transform the respective one of the ground truth labels to the embedded space. For example, the computer system or server uses the Hugging Face sentence transformer.

In step 404, the computer system or server computes a similarity score between the respective one of the textual prompts and the respective one of the ground truth labels. The computer system or server computes the similarity score in the transformed space or the embedded space. The computer system or server uses the one or more predefined reward functions or the one or more reward functions to computes the similarity score.

In step 405, the computer system or server determines whether the similarity score is greater than the predetermined threshold. If the similarity score is greater than the predetermined threshold, a pair of the respective one of the textual prompts and the respective one of the ground truth labels will be relevant; on the contrary, if the similarity score is not greater than the predetermined threshold, a pair of the respective one of the textual prompts and the respective one of the ground truth labels will be irrelevant and the pair will be filtered out.

In response to determining that the similarity score is greater than the predetermined threshold (YES branch of step 405), in step 406, the computer system or server selects a pair of the respective one of the textual prompts and the respective one of the ground truth labels as training data for tuning the large language model. The computer system or server adds the pair to a training dataset for tuning the large language model. In the embodiment shown in FIG. 1, system 100 adds the pair to selected pairs 140 of input prompts and ground truth labels.

In response to determining that the similarity score is not greater than the predetermined threshold (NO branch of step 405), in step 407, the computer system or server discards a pair of the respective one of the textual prompts and the respective one of the ground truth labels as training data for tuning the large language model. In the embodiment shown in FIG. 1, system 100 excludes the pair from selected pairs 140 of input prompts and ground truth labels.

After executing either step 406 or step 407, the computer system or server in step 408 determines whether similarity scores for all the pairs of the textual prompts and the ground truth labels are computed. The computer system or server determines whether each pair of the textual prompts and the ground truth labels received in step 401 is evaluated as a candidate of the training data.

In response to determining that the similarity scores are not computed for all the pairs (NO branch of step 408), the computer system or server reiterates steps 404, 405, 406 or 407, and 408, until the similarity scores are computed for all the pairs. In response to determining that the similarity scores are computed for all the pairs (YES branch of step 408), in step 409, the computer system or server returns a training dataset for tuning the large language model. In the embodiment shown in FIG. 1, system 100 generates selected pairs 140 of input prompts and ground truth labels for tuning the large language model.

The proposed system/method in the present invention was tested for a column-to-concept use-case. The input of the proposed system/method included main column names and other column names in a same table. The input of the proposed system/method further included ground truth mappings between the main column names and glossary labels. The output of the proposed system/method included assignments of main column names to the glossary labels. A large language model was tuned using reinforcement learning with open-source training data. The training data had about 95K pairs of input prompts and ground truth labels. In tuning the large language models using reinforcement learning, a reward function measured cosine similarity in an embedding space created by the Hugging Face sentence transformer. The cosine similarity measured the similarity between textual outputs predicted by the large language model and ground truth labels. In tuning the large language models using reinforcement learning, proximal policy optimization (PPO) was used in online reinforcement learning. In training data selection for tuning the large language models, two training datasets were generated. The first training datasets was with a cosine similarity score of 0.29, and the second training datasets was with a cosine similarity score of 0.69. A higher cosine similarity score meant that a main column name had higher similarity to a glossary label in the embedding space. In evaluation of the tuned large language model, a test dataset of column names and 10K ground truth glossary items were used. The tuned large language model produced column descriptions mapping the input main column name to the closest glossary item among 10K possible mappings.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 5, computing environment 500 contains an example of an environment for the execution of at least some of the computer code involved in performing the inventive methods, such as program(s) 526 for combining data selection and reward functions for tuning large language models using reinforcement learning. In addition to block 526, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 526, as identified above), peripheral device set 514 (including user interface (UI) device set 523, storage 524, and Internet of Things (IoT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located off chip. In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 526 in persistent storage 513.

Communication fabric 511 is the signal conduction path that allows the various components of computer 501 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, the volatile memory is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface type operating systems that employ a kernel. The code included in block 526 typically includes at least some of the computer code involved in performing the inventive methods.

Peripheral device set 514 includes the set of peripheral devices of computer 501. Data communication connections between the peripheral devices and the other components of computer 501 may be implemented in various ways, such as Bluetooth connections, Near-Field Communication (NFC)

connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

What is claimed is:

1. A computer-implemented method for tuning large language models, the computer-implemented method comprising:

receiving pairs of textual prompts and ground truth labels;

creating a data selection scoring function by repurposing a plurality of reward functions to compute similarity between the textual prompts and the ground truth labels, wherein different reward functions of the plurality of reward functions measure similarity between textual outputs produced by a large language model and the ground truth labels using different similarity metrics for different aspects of the textual prompts and the ground truth labels;

selecting a training dataset from the pairs of the textual prompts and the ground truth labels, by using the data selection scoring function; and tuning the large language model using the training dataset and reinforcement learning with the plurality of reward functions.

2. The computer-implemented method of claim 1, further comprising:

creating one or more of the plurality of reward functions, in response to determining that one or more pre-defined reward functions are not available.

3. The computer-implemented method of claim 1, further comprising:

receiving one or more of the plurality of reward functions, wherein the one or more of the plurality of reward functions is pre-defined.

4. The computer-implemented method of claim 1, wherein one of the plurality of reward functions measures cosine similarity in a transformed space.

5. The computer-implemented method of claim 1, wherein one of the plurality of reward functions measures domain knowledge based rouge-L similarity.

6. The computer-implemented method of claim 1, wherein one of the plurality of reward functions measures BERTscore semantic similarity.

7. A computer program product for tuning large language models, the computer program product comprising a computer readable storage medium having program instructions stored therewith, the program instructions executable by one or more processors, the program instructions executable to:

receive pairs of textual prompts and ground truth labels;

create a data selection scoring function by repurposing a plurality of reward functions to compute similarity between the textual prompts and the ground truth labels, wherein different reward functions of the plurality of reward functions measure similarity between textual outputs produced by a large language model and the ground truth labels using different similarity metrics for different aspects of the textual prompts and the ground truth labels;

select a training dataset from the pairs of the textual prompts and the ground truth labels, by using the data selection scoring function; and tune the large language model using the training dataset and reinforcement learning with the plurality of reward functions.

8. The computer program product of claim 7, further comprising the program instructions executable to:

create one or more of the plurality of reward functions, in response to determining that one or more pre-defined reward functions are not available.

9. The computer program product of claim 7, further comprising the program instructions executable to:

receive one or more of the plurality of reward functions, wherein the one or more of the plurality of reward functions is pre-defined.

10. The computer program product of claim 7, wherein one of the plurality of reward functions measures cosine similarity in a transformed space.

11. The computer program product of claim 7, wherein one of the one or moreplurality of reward functions measures domain knowledge based rouge-L similarity.

12. The computer program product of claim 7, wherein one of the plurality of reward functions measures BERT score semantic similarity.

13. A computer system for tuning large language models, the computer system comprising one or more processors, one or more computer readable tangible storage devices, and program instructions stored on at least one of the one or more computer readable tangible storage devices for execution by at least one of the one or more processors, the program instructions executable to:

receive pairs of textual prompts and ground truth labels;

create a data selection scoring function by repurposing a plurality of reward functions to compute similarity between the textual prompts and the ground truth labels, wherein different reward functions of the plurality of reward functions measure similarity between textual outputs produced by a large language model and the ground truth labels using different similarity metrics for different aspects of the textual prompts and the ground truth labels;

select a training dataset from the pairs of the textual prompts and the ground truth labels, by using the data selection scoring function; and tune the large language model using the training dataset and reinforcement learning with the plurality of reward functions.

14. The computer system of claim 13, further comprising the program instructions executable to:

create one or more of the plurality of reward functions, in response to determining that one or more pre-defined reward functions are not available.

15. The computer system of claim 13, further comprising the program instructions executable to:

receive one or more of the plurality of reward functions, wherein the one or more of the plurality of reward functions is pre-defined.

16. The computer system of claim 13, wherein one of the plurality of reward functions measures cosine similarity in a transformed space.

17. The computer system of claim 13, wherein one of the plurality of reward functions measures domain knowledge based rouge-L similarity.

18. The computer system of claim 13, wherein one of the plurality of reward functions measures BERTscore semantic similarity.

19. A computer-implemented method for tuning large language models, the computer-implemented method comprising:

receiving pairs of textual prompts and ground truth labels;

obtaining a plurality of reward functions selected from a group consisting of: one or more pre-defined reward functions measuring similarity between textual outputs produced by a large language model and the ground truth labels, which are retrieved in response to determining that the one or more pre-defined reward functions are available, and one or more created reward functions measuring the similarity between the textual outputs and the ground truth labels, which are created in response to determining that the one or more pre-defined reward functions are not available, wherein different reward functions of the plurality of reward functions measure similarity between the textual outputs and the ground truth labels using different similarity metrics for different aspects of the textual prompts and the ground truth labels;

creating a data selection scoring function by repurposing the plurality of reward functions to compute similarity between the textual prompts and the ground truth labels;

selecting a training dataset from the pairs of the textual prompts and the ground truth labels, by using the data selection scoring function; and tuning the large language model using the training dataset and reinforcement learning with the plurality of reward functions.

20. The computer-implemented method of claim 19, further comprising:

transforming a respective one of the textual prompts to generate an embedding vector of the respective one of the textual prompts;

transforming a respective one of the ground truth labels to generate an embedding vector of the respective one of the ground truth labels; and computing a similarity score between the respective one of the textual prompts and the respective one of the ground truth labels, by using the plurality of reward functions.

21. The computer-implemented method of claim 20, further comprising:

determining whether the similarity score is greater than a predetermined threshold; and adding a pair of the respective one of the textual prompts and the respective one of the ground truth labels into the training dataset, in response to determining that the similarity score is greater than a predetermined threshold.

22. The computer-implemented method of claim 21, further comprising:

excluding the pair of the respective one of the textual prompts and the respective one of the ground truth labels from the training dataset, in response to determining that the similarity score is not greater than a predetermined threshold.

23. A computer program product for tuning large language models, the computer program product comprising a computer readable storage medium having program instructions stored therewith, the program instructions executable by one or more processors, the program instructions executable to:

receive pairs of textual prompts and ground truth labels;

obtain a plurality of reward functions selected from a group consisting of: one or more pre-defined reward functions measuring similarity between textual outputs produced by a large language model and the ground truth labels, which are retrieved in response to determining that the one or more pre-defined reward functions are available, and one or more created reward functions measuring the similarity between the textual outputs and the ground truth labels, which are created in response to determining that the one or more pre-defined reward functions are not available, wherein different reward functions of the plurality of reward functions measure similarity between the textual outputs and the ground truth labels using different similarity metrics for different aspects of the textual prompts and the ground truth labels;

create a data selection scoring function by repurposing the plurality of reward functions to compute similarity between the textual prompts and the ground truth labels;

select a training dataset from the pairs of the textual prompts and the ground truth labels, by using the data selection scoring function; and tune the large language model using the training dataset and reinforcement learning with the plurality of reward functions.

24. The computer program product of claim 23, further comprising the program instructions executable to:

transform a respective one of the textual prompts to generate an embedding vector of the respective one of the textual prompts;

transform a respective one of the ground truth labels to generate an embedding vector of the respective one of the ground truth labels; and compute a similarity score between the respective one of the textual prompts and the respective one of the ground truth labels, by using the plurality of reward functions.

25. The computer program product of claim 24, further comprising the program instructions executable to:

determining whether the similarity score is greater than a predetermined threshold;

adding a pair of the respective one of the textual prompts and the respective one of the ground truth labels into the training dataset, in response to determining that the similarity score is greater than a predetermined threshold; and excluding the pair of the respective one of the textual prompts and the respective one of the ground truth labels from the training dataset, in response to determining that the similarity score is not greater than a predetermined threshold.

* * * * *